(12) United States Patent
Moore et al.

(10) Patent No.: US 9,223,590 B2
(45) Date of Patent: Dec. 29, 2015

(54) SYSTEM AND METHOD FOR ISSUING COMMANDS TO APPLICATIONS BASED ON CONTEXTUAL INFORMATION

(75) Inventors: Bradford Allen Moore, Sunnyvale, CA (US); Stephen W. Swales, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1009 days.

(21) Appl. No.: 12/789,684

(22) Filed: May 28, 2010

(65) Prior Publication Data
US 2011/0167340 A1    Jul. 7, 2011

Related U.S. Application Data

(60) Provisional application No. 61/292,818, filed on Jan. 6, 2010.

(51) Int. Cl.
*G06F 3/023*    (2006.01)
*G06F 9/44*    (2006.01)
*G06F 3/0488*    (2013.01)

(52) U.S. Cl.
CPC ............ *G06F 9/4443* (2013.01); *G06F 3/0233* (2013.01); *G06F 3/0237* (2013.01); *G06F 3/04883* (2013.01)

(58) Field of Classification Search
USPC .......................... 715/256, 257, 258, 262, 271
See application file for complete search history.

(56) References Cited

U.S. PATENT DOCUMENTS

| | | | |
|---|---|---|---|
| 4,674,066 A * | 6/1987 | Kucera ................................... | 1/1 |
| 5,530,861 A * | 6/1996 | Diamant et al. ............. | 705/7.21 |
| 5,854,853 A * | 12/1998 | Wang ............................ | 382/176 |
| 5,959,629 A * | 9/1999 | Masui ............................ | 715/808 |
| 6,281,886 B1 | 8/2001 | Ranieri ........................ | 645/173 |
| 6,377,965 B1 * | 4/2002 | Hachamovitch et al. ...... | 715/203 |
| 6,631,501 B1 * | 10/2003 | Jurion et al. .................... | 715/257 |
| 7,030,863 B2 | 4/2006 | Longe et al. .................. | 345/173 |
| 7,171,353 B2 | 1/2007 | Trower, II et al. | |
| 7,237,199 B1 * | 6/2007 | Menhardt et al. ............ | 715/736 |
| 7,420,543 B2 * | 9/2008 | Jayachandra ................. | 345/171 |
| 7,694,231 B2 | 4/2010 | Kocienda et al. | |
| 8,285,499 B2 | 10/2012 | Moore et al. | |
| 2004/0221168 A1* | 11/2004 | Girard .......................... | 713/193 |

(Continued)

FOREIGN PATENT DOCUMENTS

EP    1 443 395 A2    8/2004    ............. G06F 3/033

OTHER PUBLICATIONS

Ivo Ivanov; API hooking revealed; Dec. 2, 2002; CodeProject; pp. 1-16.*

(Continued)

*Primary Examiner* — Andrew Dyer
(74) *Attorney, Agent, or Firm* — Fenwick & West LLP

(57) ABSTRACT

A system and method for issuing commands to an application based on contextual information. A control application receives an indication that a text manipulation event has occurred in a user interface of a second application. Next, the control application queries the second application to obtain contextual information established by the second application prior to the event, the contextual information providing context to the text manipulation event that occurred in the user interface of the second application. The control application then issues one or more commands to the second application based on the contextual information providing context to the text manipulation event.

52 Claims, 10 Drawing Sheets

(56) References Cited

U.S. PATENT DOCUMENTS

| | | | | |
|---|---|---|---|---|
| 2004/0225965 | A1* | 11/2004 | Garside et al. | 715/531 |
| 2006/0247915 | A1* | 11/2006 | Bradford et al. | 704/1 |
| 2006/0271520 | A1 | 11/2006 | Ragan | |
| 2007/0152980 | A1 | 7/2007 | Kocienda et al. | |
| 2008/0072143 | A1 | 3/2008 | Assadollahi | 715/261 |
| 2008/0082934 | A1 | 4/2008 | Kocienda et al. | 715/773 |
| 2008/0115086 | A1 | 5/2008 | Rupp et al. | |
| 2008/0195388 | A1* | 8/2008 | Bower et al. | 704/243 |
| 2009/0063135 | A1* | 3/2009 | Fux et al. | 704/10 |
| 2009/0225041 | A1* | 9/2009 | Kida et al. | 345/173 |

OTHER PUBLICATIONS

"2 The Motivations for COM" and "3 Component Object Model Technical Overview;" The ActiveX Core Technology Reference; 1999; The Open Group; 63 pages.*

Bill Venners; Java's Security Architecture, Java's Security Model and Built-in Safety Features; Jul. 1997; JavaWorld; pp. 1-7.*

Nilsson et al., "Design patterns for user interface for mobile applications," Advances in Engineering Software, Elsevier Science, Oxford, GB, vol. 40, No. 12, Dec. 1, 2009, pp. 1318-1328.

European Search Report dated Apr. 18, 2011, received in European Application No. 11151082.2, which corresponds to U.S. Appl. No. 12/789,674.

International Search Report and Written Opinion dated Apr. 21, 2011, received in International Application No. PCT/US2011/021236, which corresponds to U.S. Appl. No. 12/789,674.

International Search Report and Written Opinion dated Jun. 1, 2011, received in International Application No. PCT/US2011/020404, which corresponds to U.S. Appl. No. 12/789,684.

Office Action dated Jun. 12, 2012, received in U.S. Appl. No. 12/789,674, 12 pages (Moore).

* cited by examiner

SYSTEM AND METHOD FOR ISSUING COMMANDS TO APPLICATIONS BASED ON CONTEXTUAL INFORMATION

RELATED APPLICATIONS

This application claims priority on U.S. Provisional Application Ser. No. 61/292,818, filed Jan. 6, 2010, entitled "System and Method for Issuing Commands to Applications Based on Contextual Information," which is incorporated herein by reference in its entirety.

This application is related to U.S. patent application Ser. No. 12/566,660, filed Sep. 24, 2009, which application is incorporated by reference herein in its entirety.

TECHNICAL FIELD

This application is related to a system and a method for providing on-screen soft keyboard services to an application executing on multifunction device, for example a mobile phone that has a touch-sensitive display and is configured to provide enhanced keyboard services to third party applications executed by the device.

BACKGROUND

Some electronic devices (e.g., a mobile phone, a portable game console, etc.) provide a user interface that includes an on-screen keyboard (also called a soft keyboard) that allows a user to enter text into the user interface by touching virtual keys displayed on a touch-sensitive display device (sometimes called a touch screen display). Typically, the on-screen keyboard is a system keyboard that is provided by the operating system of the electronic device. In addition to providing the system keyboard, the operating system of the electronic device handles text manipulation events (e.g., insert, delete, select and replace commands) received from the system keyboard and provides enhanced keyboard functions such as spell checking When a third-party application requires text input from a user, the third-party receives information and/or commands from the system keyboard provided by the operating system of the electronic device. Unfortunately, the enhanced keyboard functions provided by the operating system often require contextual information, such as text (or other symbols) positioned before and/or after the current text or cursor position, and therefore the enhanced keyboard functions are not available to third-party applications that store contextual information in storage locations that unknown to the operating system, and/or that store contextual information in a manner (e.g., using data structures, formats, metadata, or the like) unknown to the operating system.

SUMMARY OF DISCLOSED EMBODIMENTS

To address the aforementioned deficiencies, some embodiments provide a system, computer readable storage medium including instructions, and a computer-implemented method for issuing commands from a control application to a second application (e.g., a third-party application) based on contextual information received from the second application. In these embodiments, the control application provides enhanced keyboard functions (i.e., functions other than simply delivery of single keystroke commands) to the second application. In some embodiments, the control application receives an indication that a text manipulation event has occurred in a user interface of the second application. Next, the control application queries the second application to obtain contextual information established by the second application prior to the event, the contextual information providing context to the text manipulation event that occurred in the user interface of the second application. The control application then issues one or more commands to the second application based on the contextual information providing context to the text manipulation event.

In some embodiments, in response to the querying by the control application, the second application determines the contextual information providing context to the text manipulation event and responds to the querying by the control application by providing the contextual information providing context to the text manipulation event that occurred in the user interface of the second application.

In some embodiments, the second application determines the contextual information providing context to the text manipulation event by determining a text direction associated with a logical location of the text manipulation event and determining boundaries of a predetermined text unit that includes the text associated with the logical location of the text manipulation event based on the text direction.

In some embodiments, in response to the issuing of the one or more commands by the control application, the second application executes the one or more commands issued by the control application.

In some embodiments, the contextual information relating to the text manipulation event includes a logical location and a predetermined unit of text relating to the text manipulation event.

In some embodiments, the predetermined unit of text is selected from the group consisting of a character, a word, a sentence, a paragraph, a line of text, a section of a document, and a document.

In some embodiments, the logical location of the text manipulation event is selected from the group consisting of a point between two characters in the user interface of the second application and a range including one or more characters that is selected in the user interface of the second application.

In some embodiments, a respective query from the control application requesting the contextual information of the text manipulation event includes a physical location of the text manipulation event in the user interface of the second application, and the logical location of the text manipulation event corresponding to the physical location.

In some embodiments, the text manipulation event is selected from the group consisting of an insertion of one or more characters, a deletion one or more characters, a selection of one or more characters, and a deselection of one or more characters.

In some embodiments, the control application determines the one or more commands based on the contextual information, which provides context to the text manipulation event, prior to issuing one or more commands to the second application.

In some embodiments, the control application determines that the contextual information and text manipulation event indicate a sequence of characters that represent a single character. Next, the control application determines one or more single characters from a plurality of possible single characters based on the contextual information and text manipulation event. The control application then generates one or more commands for instructing the second application to display, for user selection, the one or more single characters from the plurality of possible single characters.

In some embodiments, the control application determines that the contextual information and text manipulation event indicate a sequence of characters that represent a potentially misspelled word. Next, the control application determines one or more words from a plurality of possible words that represent a correct spelling of the potentially misspelled word. The control application then generates one or more commands for instructing the second application to display, for user selection, the one or more words from the plurality of possible words.

In some embodiments, the control application determines that the contextual information and text manipulation event indicate a sequence of characters that represent a portion of a word. Next, the control application determines one or more candidate words from a plurality of possible words determined in accordance with the portion of the word. The control application then generates one or more commands for instructing the second application to display, for user selection, the one or more candidate words.

In some embodiments, the control application receives the text manipulation event in the user interface of the second application.

In some embodiments, the second application notifies the control application that contextual information obtained by the control application from the second application can no longer be relied upon by the control application.

In some embodiments, the second application notifies the control application that a selection of text in the second application has changed.

BRIEF DESCRIPTION OF THE DRAWINGS

Like reference numerals refer to corresponding parts throughout the drawings.

DESCRIPTION OF EMBODIMENTS

Figure 1:
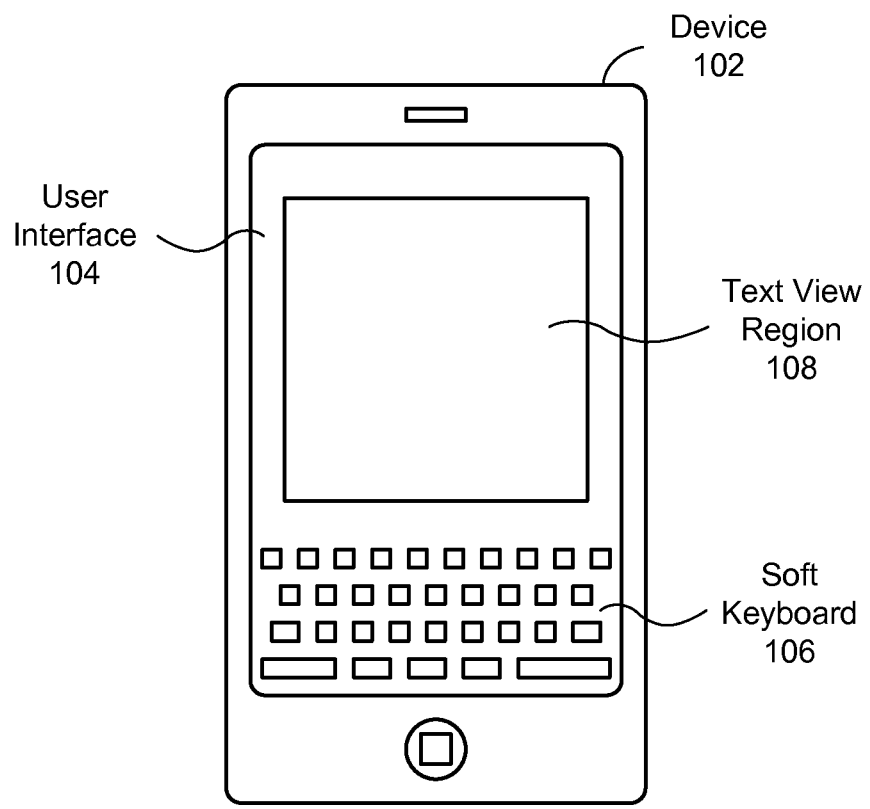
FIG. 1 is a block diagram illustrating a user interface of a device, according to some embodiments.

Some embodiments provide a system, computer readable storage medium including instructions, and a computer-implemented method for allowing a third-party application executing on a device to receive enhanced keyboard services. In these embodiments, a control application of the device provides the enhanced keyboard services to the third-party application by issuing commands from the control application to the third-party application based on contextual information received from the third-party application. These embodiments are described in detail below.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of computing devices, user interfaces for such devices, and associated processes for using such devices are described. In some embodiments, the computing device is a portable communications device, such as a mobile telephone, that also contains other functions, such as PDA and/or music player functions. Exemplary embodiments of portable multifunction devices include, without limitation, the iPhone® and iPod Touch® devices from Apple Inc. of Cupertino, Calif. Other portable devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, a computing device that includes a display and a touch-sensitive surface is described. It should be understood, however, that the computing device may include one or more other physical user-interface devices, such as a physical keyboard, a mouse and/or a joystick.

The device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entireties. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

In some of the embodiments of the systems and methods described below, "touch-based gestures" (sometimes called "touch gestures") include not only gestures, made by one or more fingers or one or more styluses, that make physical contact a touch-sensitive screen 112 or other touch-sensitive surface, but also gestures that occur, in whole or in part, sufficiently close to touch-sensitive screen 112 or other touch-sensitive surface that the one or more sensors of touch-sensitive screen 112 or other touch-sensitive surface are able to detect those gestures.

FIG. 1 is a block diagram illustrating a user interface 104 of a device 102, according to some embodiments. FIG. 1 illustrates the user interface when the device 102 is executing an application. In this example the user interface 104 includes a soft keyboard 106 and a text view region 108, both displayed on a touch-sensitive display of the device 102.

In some embodiments, the device 102 is a portable multifunction electronic device that includes a touch-sensitive display (sometimes called a touch screen or touch screen display) configured to present the user interface 104. In various embodiments, the device 102 is a consumer electronic device, mobile telephone, smart phone, video game system, electronic music player, tablet PC, electronic book reading system, e-book, personal digital assistant, navigation device, electronic organizer, email device, laptop or other computer, kiosk computer, vending machine, smart appliance, or the like.

Figure 2:
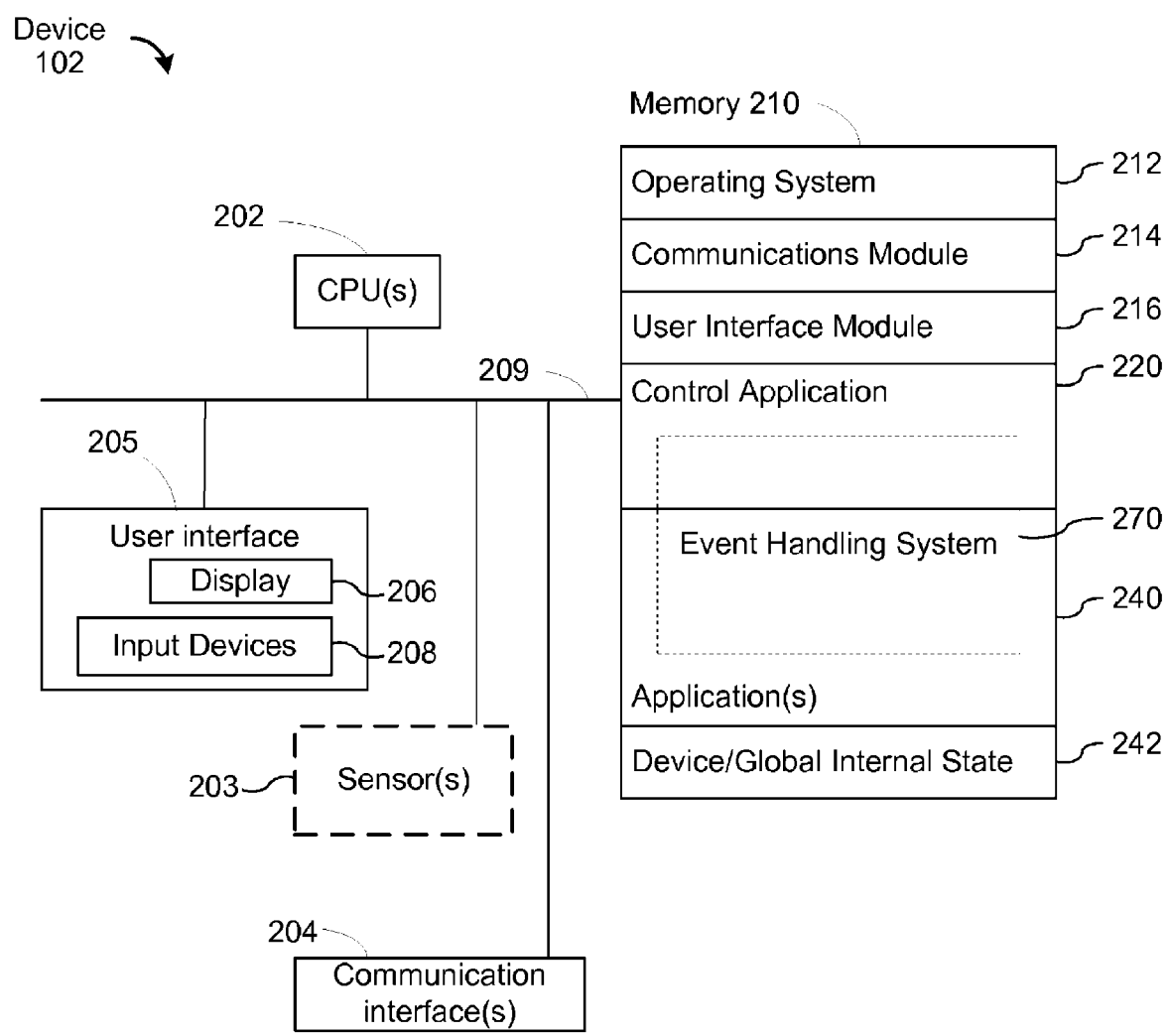
FIG. 2 is a block diagram illustrating a device, according to some embodiments.

FIG. 2 is block diagram illustrating device 102 according to some embodiments. Device 102 includes one or more processing units (CPU's) 202, one or more network or other communications interfaces 204, memory 210, and one or more communication buses 209 for interconnecting these components. Communication buses 209 may include circuitry (sometimes called a chipset) that interconnects and controls communications between system components. Device 102 also includes a user interface 205 having a display device 206 (e.g., a touch-sensitive display having a touch-sensitive surface) and optionally including additional input devices 208 (e.g., one or more of: keyboard, mouse, trackball, touchpad having a touch-sensitive surface, keypad having physical keys or buttons, microphone, etc.). In embodiments in which the display device 206 is not a touch-sensitive display, the input devices 208 include a touchpad having touch-sensitive surface. In some embodiments, device 102 includes one or more sensors 203, such as one or more accelerometers, magnetometer, gyroscope, GPS receiver, microphone, one or more infrared (IR) sensors, one or more biometric sensors, camera, etc. Any input device 208 herein described as an input device may equally well be described as a sensor 203, and vice versa. In some embodiments, signals produced by the one or more sensors 203 are used as input sources for detecting events.

Memory 210 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 210 may optionally include one or more storage devices remotely located from the CPU(s) 202. Memory 210, or alternately the non-volatile memory device(s) within memory 210, comprises a computer readable storage medium. In some embodiments, memory 210 stores the following programs, modules and data structures, or a subset thereof:

operating system 212 that includes procedures for handling various basic system services and for performing hardware dependent tasks;

communication module 214 that is used for connecting the device 102 to other computers via the one or more communication interfaces 204 (wired or wireless) and one or more communication networks, such as the Internet, other wide area networks, local area networks, metropolitan area networks, and so on;

user interface module 216 that receives commands input by the user via the display 206 (if the display is a touch-sensitive display), input devices 208, and/or sensor 203, and generates user interface objects for display by display device 206;

control application 220 that receives text manipulation events, queries applications 240 for contextual information that provide context to the text manipulation events, and issue commands to applications 240 based on the contextual information, as described herein;

one or more applications 240 (e.g., an email application, a web browser application, a text messaging application, third party applications, etc.), as described herein; and event handling system 270 (in the device 102) that may be implemented in various embodiments within control application 220 and/or applications 240, as described herein; in some embodiments, however, some aspects of event handling system 270 are implemented in control application 220 while other aspects are implemented in applications 240; and device/global internal state 242.

Each of the above identified modules, applications and systems is stored in one or more of the previously mentioned memory devices, and corresponds to a set of instructions for performing a function described above. The set of instructions are executed by one or more processors (e.g., CPUs 202). The above identified modules or programs (i.e., sets of instructions) need not be implemented as separate software programs, procedures or modules, and thus various subsets of these modules may be combined or otherwise re-arranged in various embodiments. In some embodiments, memory 210 stores a subset of the modules and data structures identified above. Furthermore, memory 210 may store additional modules and data structures not described above.

Although FIG. 2 shows a block diagram of a device 102, FIG. 2 is intended more as functional description of the various features which may be present in the device 102 than as a structural schematic of the embodiments described herein. In practice, and as recognized by those of ordinary skill in the art, items shown separately could be combined and some items could be separated. For example, in some embodiments, the control application 220 is included in the operating system 212.

When performing a touch-based gesture on the touch-sensitive surface of display device 206 or a touchpad, the user generates a sequence of events and/or sub-events that are processed by one or more processing units of the device 102 (e.g., the one or more processors 202 illustrated in FIG. 2). In some embodiments, the one or more processing units of the device 102 process the sequence of events and/or sub-events to recognize events.

Figure 3A:
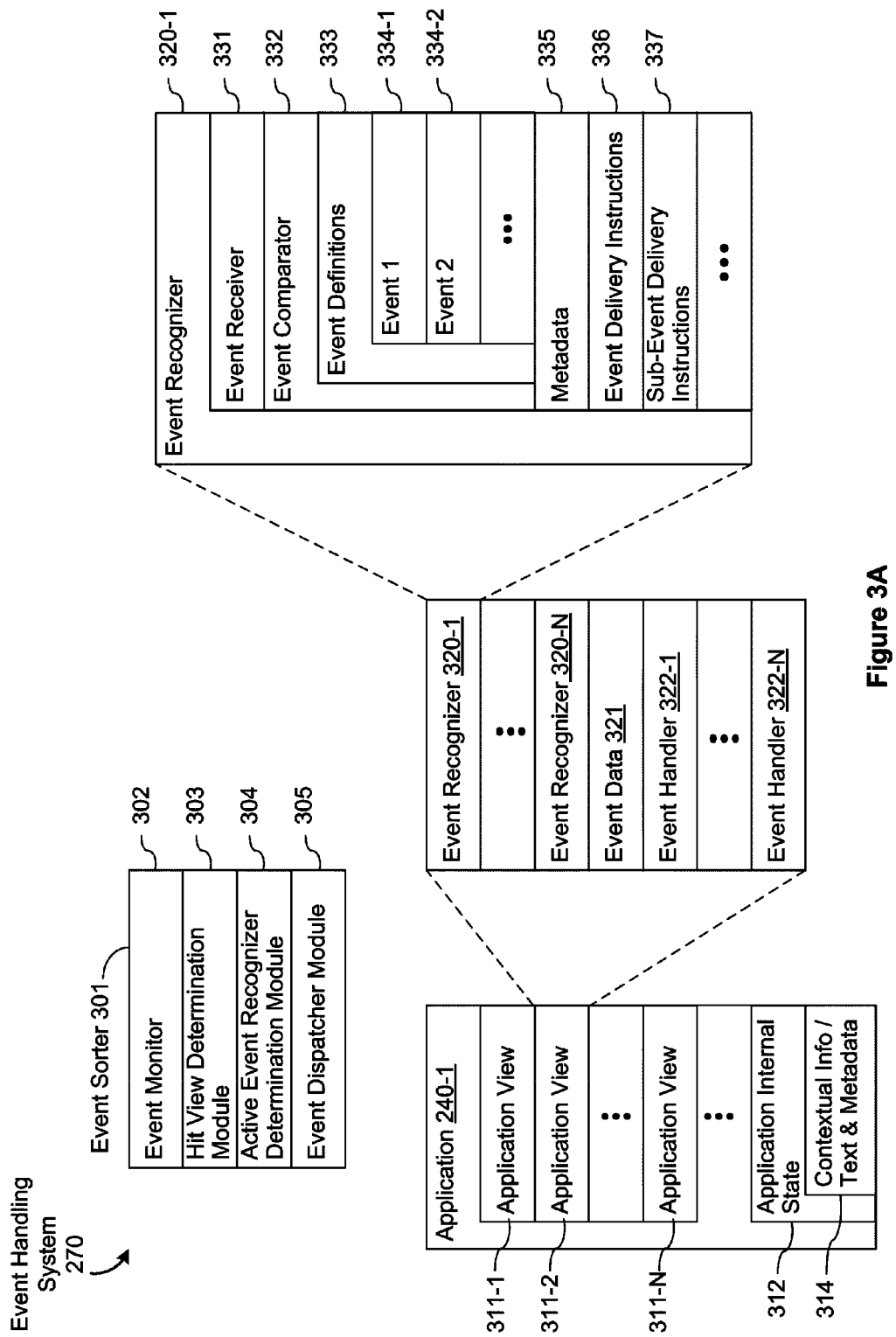
FIG. 3A is a block diagram illustrating exemplary components of an event handling system, according to some embodiments.

FIG. 3A is a block diagram illustrating exemplary components of the event handling system 270, according to some embodiments. In the following discussion of FIGS. 3A and 3B, display device 206 is a touch-sensitive display having a touch-sensitive surface. However, in other embodiments the event handling system 270 is used in conjunction with a device 102 having a non-touch sensitive display and a touch pad having a touch-sensitive surface. The event handling system 270 includes event sorter 301, which receives event information and determines an application 240-1 and at least one application view 311 to which to deliver the event information.

As shown in FIG. 3A, application 240-1 has an application internal state 312. As discussed in more detail below, application internal state 312 includes contextual information 314 (e.g., text and metadata) needed to provided enhanced keyboard services to application 240-1. Application internal state 312, however, is not directly accessible by control application 220, because the memory location(s) of the application internal state 312 is(are) not known to control application 220, or the memory location(s) of the application internal state 312 is(are) not directly accessible by the control application, and/or because application 240-1 stores information in application internal state 240-1 in a manner (e.g., using data structures, formats, metadata, or the like) unknown to control application 220.

In some embodiments, event sorter 301 includes an event monitor 302 and an event dispatcher module 305. Event monitor 302 receives event information from operating system 212. In some embodiments, event information includes information about a sub-event (e.g., a portion of a touch-based gesture on touch-sensitive display 206). The operating system 212 transmits information it receives from the user interface 205 to event monitor 302. Information that the operating system 212 receives from the user interface 205 includes event information from the display device 206 (i.e., a touch-sensitive display) or touch pad having a touch-sensitive surface).

In some embodiments, event monitor 302 sends requests to operating system 212 at predetermined intervals. In response, operating system 212 transmits event information to event monitor 302. In other embodiments, operating system 212 transmits event information only when there is a significant event (e.g., receiving an input beyond a predetermined noise threshold and/or for more than a predetermined duration).

In some embodiments, event sorter 301 also includes a hit view determination module 303 and/or an active event recognizer determination module 304. The hit view determination module 303 includes software procedures for determining where a sub-event has taken place within one or more views (e.g., application views 311), when the display device 206 displays more than one view. A spatial aspect of the user interface associated with an application is a set views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

In some embodiments, the hit view determination module 303 receives information related to sub-events of a touch-based gesture. When an application has multiple views organized in a hierarchy, the hit view determination module 303 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit-view is identified by the hit view determination module, the identified hit view typically receives all sub-events related to the same touch or input source for which it was identified as the hit view.

In some embodiments, active event recognizer determination module 304 determines which view or views within a view hierarchy should receive a particular sequence of sub-events. In some circumstances, active event recognizer determination module 304 determines that only the hit view should receive a particular sequence of sub-events. In other circumstances, active event recognizer determination module 304 determines that all views that include the physical location of a sub-event are actively involved views, and therefore determines that all actively involved views should receive a particular sequence of sub-events. In some embodiments, even when touch sub-events are entirely confined to the area associated with one particular view, views higher in the view hierarchy continue to be actively involved views.

In some embodiments, event dispatcher module 305 dispatches the event information to an event recognizer (e.g., event recognizer 320). In embodiments including active event recognizer determination module 304, event dispatcher module 305 delivers the event information to an event recognizer determined by active event recognizer determination module 304. In some embodiments, event dispatcher module 305 stores event information, which is retrieved by a respective event receiver module 331, in an event queue.

In some embodiments, operating system 212 includes event sorter 301, while in some other embodiments application 240-1 includes event sorter 301. In yet other embodiments, event sorter 301 is a stand-alone module, or a part of another module stored in memory 210.

In some embodiments, application 240-1 includes one or more application views 311, each of which includes instructions for handling touch events that occur with a respective view of the application's user interface. Each application view 311 of the application 240-1 includes one or more event recognizers 320 and one or more event handlers 322. Typically, a respective application view 311 includes a plurality of event recognizers 320 and a plurality of event handlers 322. In other embodiments, one or more of the event recognizers 320 are part of a separate module, such as a user interface kit (not shown) or a higher level object from which application 240-1 inherits methods and other properties. In some embodiments, a respective application view 311 also includes event data 321 received from event sorter 301.

A respective event recognizer 320 receives event information (e.g., event data 321) from the event sorter 301 and identifies an event from the event information. Event recognizer 320 includes event receiver 331 and event comparator 332. In some embodiments, event recognizer 320 also includes at least a subset of: metadata 335, event delivery instructions 336, and sub-event delivery instructions 337.

Event receiver 331 receives event information from event sorter 301. The event information includes information about a sub-event, for example, a touch or a movement. Depending on the sub-event, the event information also includes additional information, such as a location (e.g., a physical location) of the sub-event. When the sub-event concerns motion of a touch, the event information may also include speed and direction of the sub-event. In some embodiments, a respective event includes rotation of the device from one orientation to another (e.g., from a portrait orientation to a landscape orientation, or vice versa), and the event information includes corresponding information about the current orientation (also called device attitude) of the device.

Event comparator 332 compares the event information to predefined event or sub-event definitions and, based on the comparison, determines an event or sub-event, or determines or updates the state of an event or sub-event. In some embodiments, event comparator 332 includes event definitions 333.

Event definitions 333 contain definitions of events (e.g., predefined sequences of sub-events), for example, event 1 (334-1), event 2 (334-2), and others. In some embodiments, sub-events in an event 334 include, for example, touch begin, touch end, touch movement, touch cancellation, and multiple touching. In one example, the definition for event 1 (337-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (334-2) is a dragging on a displayed object. The dragging, for example, comprises a touch (or contact) on the displayed object for a predetermined phase, a movement of the touch across the display device 206, and lift-off of the touch (touch end). In some embodiments, the event also includes information for the event's associated event handlers 322.

In some embodiments, event definitions 333 includes a definition of an event for a respective user-interface object. In some embodiments, event comparator 332 performs a hit test to determine which user-interface object is associated with a sub-event. For example, in an application view in which three user-interface objects are displayed on a touch-sensitive display such as the display device 206, when a touch is detected on the display device 206, the event comparator 332 performs a hit test to determine which of the three user-interface objects is associated with the touch (sub-event). If each displayed object is associated with a respective event handler 322, the event comparator uses the result of the hit test to determine which event handler 322 should be activated. For example, event comparator 332 selects an event handler associated with the sub-event and the object triggering the hit test.

In some embodiments, the definition for a respective event 334 also includes delayed actions that delays delivery of the event information until after it has been determined whether the sequence of sub-events does or does not correspond to the event recognizer's event type.

When a respective event recognizer 320 determines that the series of sub-events do not match any of the events in the event definitions 333, the event recognizer 320 enters an event impossible or event cancel state, after which is disregards subsequent sub-events of the touch-based gesture. In this situation, other event recognizers, if any, that remain active for the hit view continue to track and process sub-events of an ongoing touch-based gesture.

In some embodiments, a respective event recognizer 320 includes metadata 335 with configurable properties, flags, and/or lists that indicate how the event delivery system should perform sub-event delivery to actively involved event recognizers. In some embodiments, metadata 335 includes configurable properties, flags, and/or lists that indicate how event recognizers may interact with one another. In some embodiments, metadata 335 includes configurable properties, flags, and/or lists that indicate whether sub-events are delivered to varying levels in the view or programmatic hierarchy.

In some embodiments, a respective event recognizer 320 activates event handler 322 associated with an event when one or more particular sub-events of an event are recognized. In some embodiments, a respective event recognizer 320 delivers event information associated with the event to event handler 322. Activating an event handler 322 is distinct from sending (and deferred sending) sub-events to a respective hit view. In some embodiments, event recognizer 320 throws a flag associated with the recognized event, and event handler 322 associated with the flag catches the flag and performs a predefined process.

In some embodiments, event delivery instructions 336 include sub-event delivery instructions 337 that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

Figure 3B:
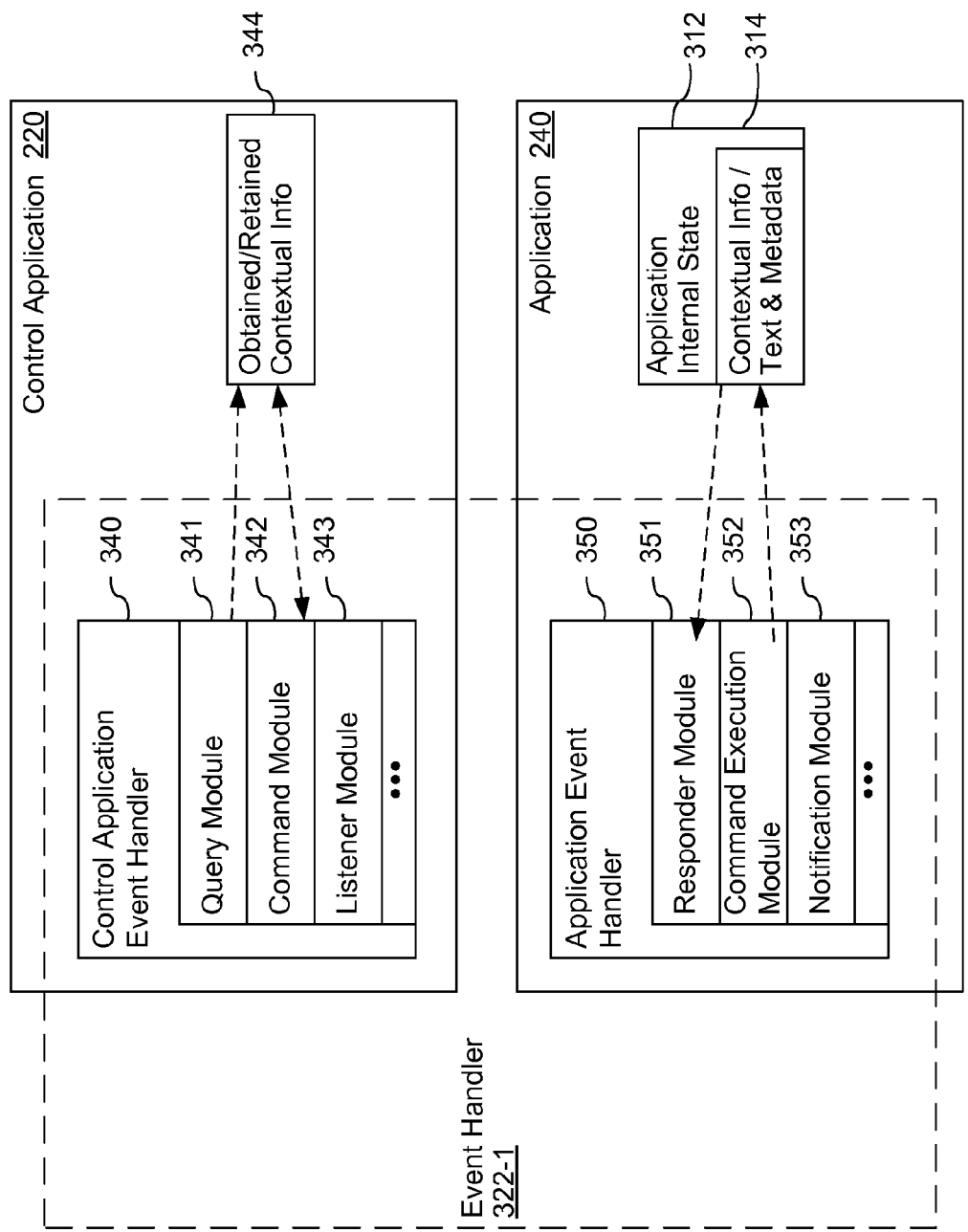
FIG. 3B is a block diagram illustrating an event handler, according to some embodiments.

FIG. 3B is a block diagram illustrating a respective event handler 322-1, according to some embodiments. Event handler 322-1 includes a control application event handler 340 and an application event handler 350. In some embodiments, control application event handler 340 is included in control application 220 and application event handler 350 is included in a respective application 240 (e.g., a third party application). Stated another way, event handler 322-1 is implemented partially in control application 220 and partially in application 240. Furthermore, while application event handler 350 utilizes and updates application internal state 312 of application 240, control application event handler 340 utilizes and updates retained contextual information 344, which is typically a subset of contextual information 314 in application internal state 312.

In some embodiments, control application event handler 340 includes a query module 341, a command module 342, and a listener module 343. The modules of control application event handler 340 form an application programming interface (API) for providing enhanced keyboard services to applications 240 executed by device 102.

Control application 220 stores retained contextual information 344 that has been obtained from or for application 240. It is noted that the retained contextual information 344 includes both contextual information obtained from application 240 as well as contextual information updates corresponding to commands issued by command module 342 (of a respective control application event handler 340) to application 240. If two or more applications 240 are currently active, control application 220 separately retains contextual information 344 for each currently active application 240.

Query module 341 queries the application 240 for contextual information relevant to a text manipulation event (e.g., adding text, deleting text, editing text, selecting text, deselecting text, etc.). For example, if the user of the device 102 entered text, the contextual information may include a range of text including the entered text (e.g., one or more characters, one or more words, one or more sentences, one or more paragraphs, one or more lines of text, one or more sections of a document, etc.). In some embodiments, queries from the query module 341 are received and processed by a responder module 351 of application event handler 350, as discussed below. Information obtained by query module 341 is used by the control application 220 to update the contextual information 344 retained by the control application for application 240. The retained contextual information 344 typically includes one or more characters, words, sentences, lines of text, or sections of a document preceding the location associated with a current text manipulation event.

The retained contextual information 344 is used by event handler 322 to provide enhanced keyboard services, such as one or more of: spelling correction; autocompletion of incomplete words; grammar checking; adjusting the hit zone of one or more keys in a soft keyboard based on the context of the current text entry (or cursor) location, so as to enlarge the hit zone of one or more keys representing letters or symbols having a statistically high likelihood of being the next key to be selected by the user and/or decreasing the size of the hit zone of one or more keys representing letters or symbols having a statistically high likelihood of being the next key to be selected by the user; and the like.

The command module 342 issues commands to application 240 based on the text manipulation event and the obtained/retained contextual information 344. For example, command module 342 may instruct application 240 to replace a potentially misspelled word with a correct spelling of the potentially misspelled word. In some embodiments, commands issued by command module 342 are received and processed by command execution module 352 of application event handler 350, as discussed below.

Listener module 343 listens to notifications by application 240 (e.g., notifications issued via notification module 353 of application 240) that contextual information 344 retained by control application 220 for application 240 can no longer be relied upon by control application 220.

In some embodiments, application event handler 350 includes responder module 351, command execution module 352, and notification module 353. Responder module 351 responds to queries by control application 220 (e.g., queries from query module 341 of control application 220) for contextual information that provides context to a text manipulation event. Responder module 351 obtains the requested contextual information from the contextual information 314 stored by application 240 in application internal state 312. Command execution module 352 executes commands issued by control application 220 (e.g., issued by command module 342 of control application 220). Execution of those commands updates the contextual information 314 (e.g., text and/or metadata for text) stored by application 240 in application internal state 312. Notification module 353 notifies control application 220 that retained contextual information 344 for application 240 can no longer be relied upon by control application 220.

In some situations, the command execution module can ignore a command issued by control application 220. For example, in some embodiments command execution module 352 ignores a command issued by control application 220 when command execution module 352 and/or application 240 determines that the command is contrary to a predefined policy, fails to meet predefined criteria, or implements a feature not supported by application 240. In such situations, application 240 will typically invoke notification module 353 to notify control application 220 that retained contextual information 344 for application 240 can no longer be relied upon by control application 220.

The foregoing discussion regarding event handling for touch-based gestures on touch-sensitive displays also applies to other forms of user inputs from various input devices, which may be utilized as inputs corresponding to sub-events which define an event to be recognized. In some embodiments, such user inputs include one or more of: mouse movements; mouse button presses, with or without single or multiple keyboard presses or holds; user movements, taps, drags, scrolls, etc., on a touch pad; pen stylus inputs; movement or rotation of the device; oral instructions; detected eye movements; biometric inputs; and/or any combination thereof.

Figure 4:
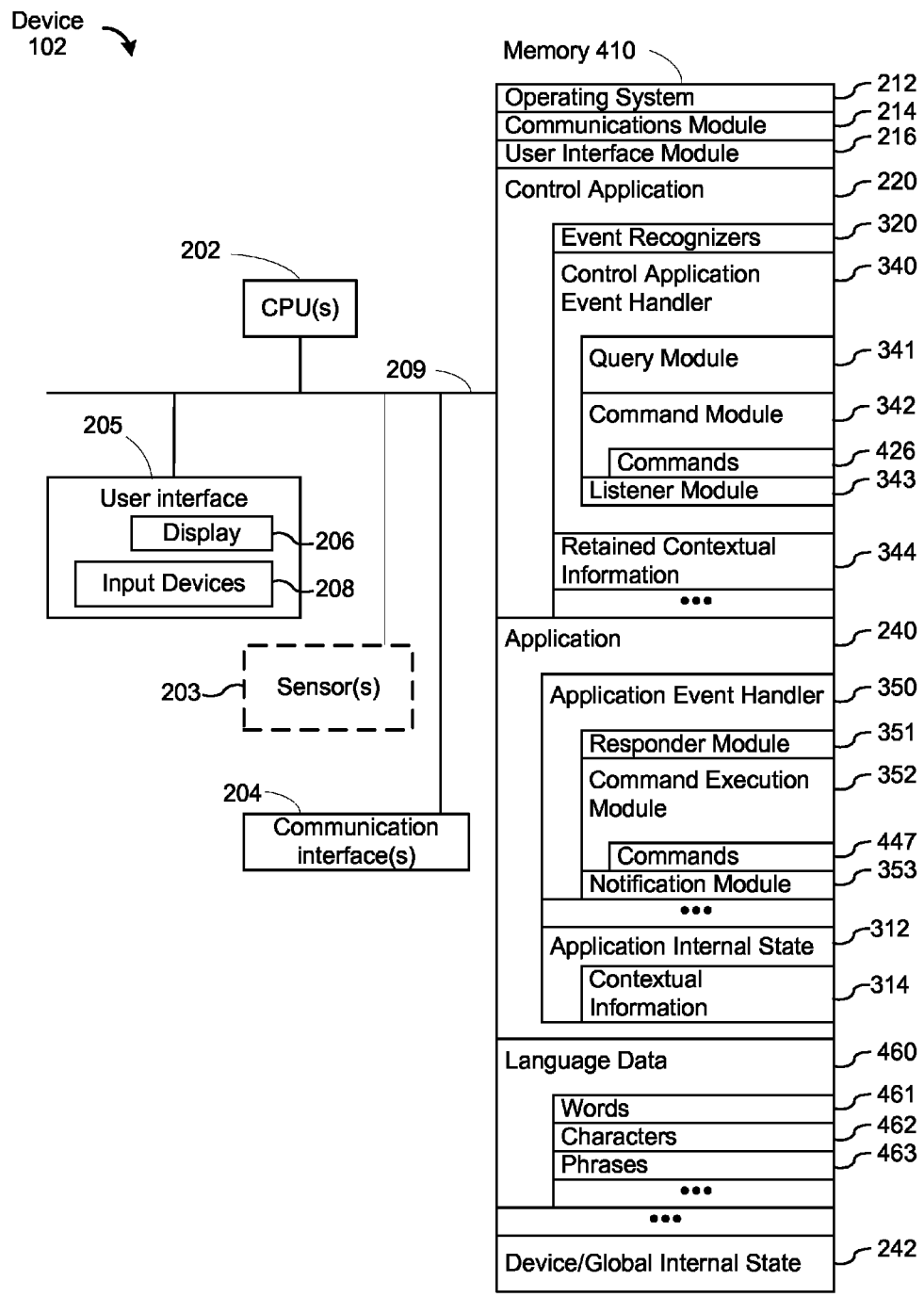
FIG. 4 is a block diagram illustrating an exemplary device, according to some embodiments.

FIG. 4 presents one particular implementation of device 102, according to some embodiments. It is noted that FIG. 4 is the same as FIG. 2 except with respect to control application 220, application 240 and event handling 270. Aspects of FIG. 4 that are the same as FIG. 2 are already described above, and thus not repeated here.

Control application 220 includes event recognizers 320, and control application event handlers 340. Each control application event handler 340 includes a query module 341 (e.g., the query module 341 in FIG. 3B) that queries a respective application 240 for contextual information 314 that provides context to text manipulation events; a command module 342 (e.g., the command module 342 in FIG. 3B) that issues commands 426 to the application 240; and a listener module 343 (e.g., the listener module 343 in FIG. 3B) that listens for notifications from a notification module 353 of application 240, as described herein. As noted above, and shown in FIG. 4, control application event handler 340 utilizes and updates retained contextual information 344, which is typically a subset of contextual information 314 in application internal state 312 of application 240.

Application 240 (e.g., an email application, a web browser application, a text messaging application, or a third party application) has an application internal state 312, which includes contextual information 314. As noted above, contextual information 314 is typically text and metadata (color, font, size, selection status, etc.) concerning the text, but may include other information as well. Application 240 also includes a plurality of application event handler 350, one of which is shown in FIG. 4. Application event handler 350 includes responder module 351 that responds to queries by the query module 341, command execution module 352 that executes commands 447 issued by the control application 220, and notification module 353 that notifies control application 220 when contextual information previously provided to control application 220 can no longer be relied upon, as described above with reference to FIG. 3B.

Memory 210 of device 102 also stores language data 460 for one or more languages. Language data 460 provides information used to provide the aforementioned enhanced keyboard services. In some embodiments, language data 460 includes data structures that represent valid words 461, characters 462, and/or phrases 463 for the one or more languages.

Each of the above identified systems, modules and applications is stored in one or more of the previously mentioned memory devices of device 102, and corresponds to a set of instructions for performing a function described above. The set of instructions can be executed by one or more processors (e.g., CPUs 202). The above identified modules or programs (i.e., sets of instructions) need not be implemented as separate software programs, procedures or modules, and thus various subsets of these modules may be combined or otherwise re-arranged in various embodiments. In some embodiments, memory 210 may store a subset of the modules and data structures identified above. Furthermore, memory 210 may store additional modules and data structures not described above.

Although FIG. 4 shows a "device," FIG. 4 is intended more as functional description of the various features which may be present in a device than as a structural schematic of the embodiments described herein. In practice, and as recognized by those of ordinary skill in the art, items shown separately could be combined and some items could be separated.

Figure 5A:
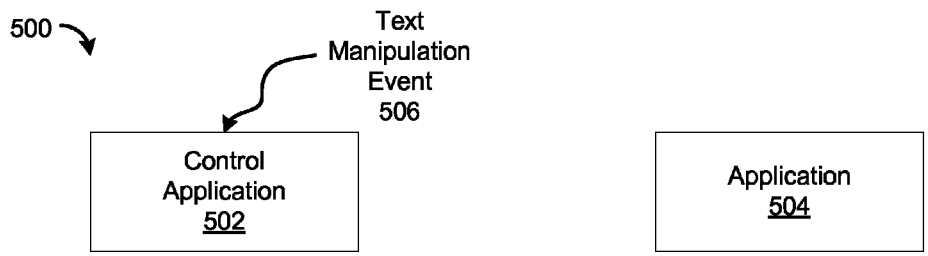
FIG. 5A is a block diagram illustrating a control application receiving a text manipulation event, according to some embodiments.
Figure 5B:
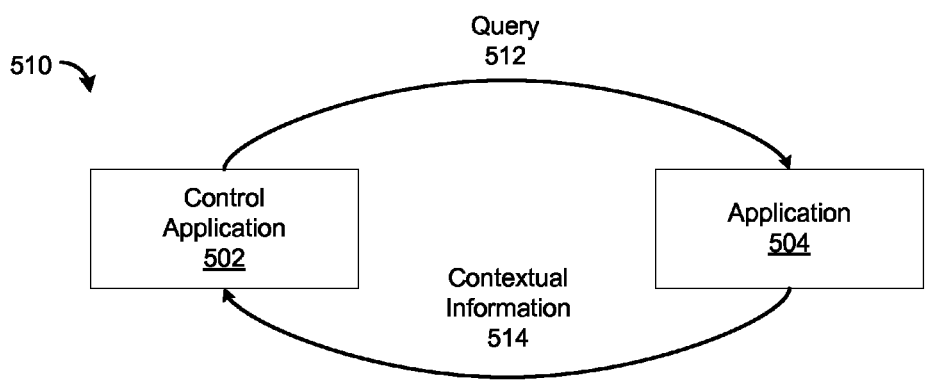
FIG. 5B is a block diagram illustrating a control application querying an application for contextual information, according to some embodiments.
Figure 5C:
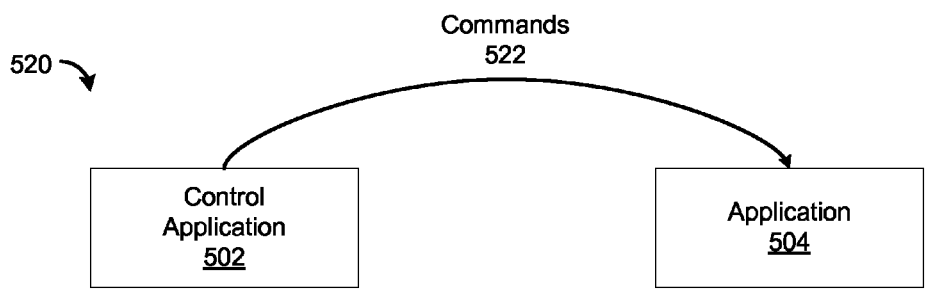
FIG. 5C is a block diagram illustrating a control application issuing commands to an application, according to some embodiments.

As discussed above, control application 220 of device 102 provides the functionality of a system keyboard with enhanced keyboard services to third-party applications executing on device 102. FIGS. 5A, 5B and 5C are block diagrams 500, 510, and 520, respectively, illustrating an exemplary sequence of events between control application 502 of a device (e.g., the device 102) and an application 504 (e.g., a third-party application) also executed by of the device so as to provide enhanced keyboard services to the application 504, according to some embodiments. In FIG. 5A, the control application 502 receives an indication of a text manipulation event 506. In FIG. 5B, the control application 502 queries 512 the application 504 for contextual information that provides context for the text manipulation event 506. The application 504 responds to the query 512 by providing contextual information 514 to the control application 502. In FIG. 5C, the control application 502 issues commands 522 to the application 504 based on the contextual information 514 (and/or based on other retained contextual information 344 obtained in response to prior text manipulation events) and the text manipulation event 506. For example, commands 522, when executed by application 504, may instruct application 504 to replace one or more characters of in the user interface of the application 504.

The queries, contextual information, and commands described in FIGS. 5A to 5C allow a third-party application to not only receive keystrokes from a keyboard, but to also received enhanced keyboard services even though the internal state (242, FIG. 4) of the third-party application is not directly accessible to the operating system or control application of the device.

The events illustrated in FIGS. 5A to 5C are described in more detail with respect to FIGS. 6 to 10 below.

Figure 6:
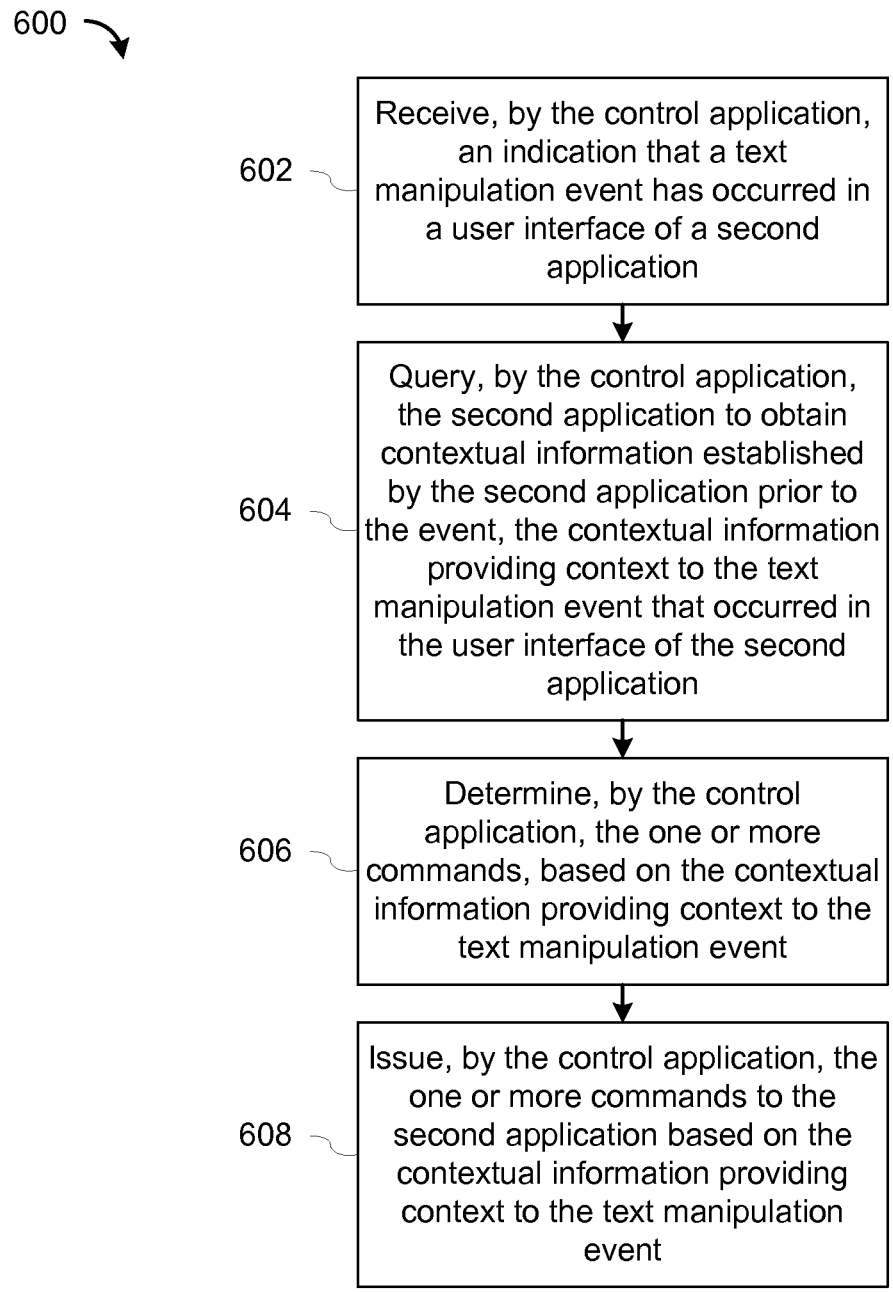
FIG. 6 is a flowchart of a method for issuing commands to an application based on contextual information, according to some embodiments.

FIG. 6 is a flowchart of a method 600 for issuing commands to an application based on contextual information, according to some embodiments. A control application (e.g., control application 220 or 502) receives (602) an indication that a text manipulation event has occurred in a user interface of a second application (e.g., a third-party application such as application 240 or 504). For example, the control application may be notified by an event handler that a text manipulation event occurred within a particular application view, or set of application views, of the second application. In some embodiments, the control application receives the text manipulation event prior to the second application. For example, the control application may receive event information for the text manipulation event (e.g., the characters inserted, deleted, selected, etc.) directly from an event handler prior to that information being provided to the second application. In some embodiments, the text manipulation event is selected from the group consisting of an insertion of one or more characters, a deletion one or more characters, a selection of one or more characters, and a deselection of one or more characters.

Next, the control application queries (604) the second application to obtain contextual information established by the second application prior to the event, wherein the contextual information provides context to the text manipulation event that occurred in the user interface of the second application. In some embodiments, the contextual information relating to the text manipulation event includes a logical location and a predetermined unit of text relating to the text manipulation event. In some embodiments, the logical location of the text manipulation event is selected from the group consisting of a point between two characters in the user interface of the second application and a range including one or more characters that is selected in the user interface of the second application. In some embodiments, the predetermined unit of text is selected from the group consisting of a character, a word, a sentence, a paragraph, a line of text, a section of a document, and a document.

In some embodiments, a respective query from the control application requesting the contextual information of the text manipulation event includes a physical location of the text manipulation event in the user interface of the second application, and the logical location of the text manipulation event corresponding to the physical location. In general, a physical location may include a set of coordinates relative to a coordinate system for a display device. For example, the coordinate system may be defined relative to a display area of the display device. Alternatively, the coordinate system may be defined relative to an input area of the display device (e.g., for a touch screen or a touch-sensitive display device).

In some embodiments, operation 604 is performed only when the control application does not already have sufficient contextual information to determine the one or more commands to be sent to the second application. In particular, while processing prior text manipulation events, the control application obtains and retains contextual information for the second application. Therefore, contextual information for the second application may already be known (i.e., retained) by the control application prior to the text manipulation event. If the information received for the current text manipulation event is at a location (in the user interface of the second application) for which the control application already has contextual information (i.e., sufficient contextual information to provide enhanced keyboard services), and the second application has not sent a command to the control application invalidating the retained contextual information, the control application skips operation 604. Thus, in these embodiments operation 604 is a conditional operation.

Figure 7:
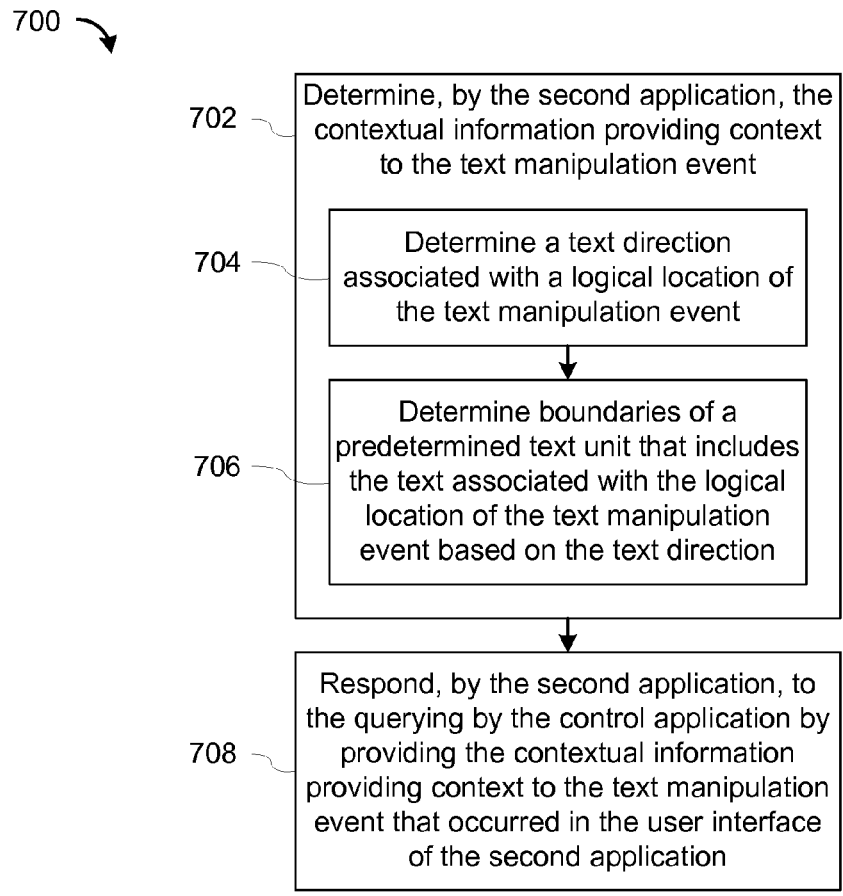
FIG. 7 is a flowchart of a method for determining contextual information that provides context to a text manipulation event, according to some embodiments.
Figure 8:
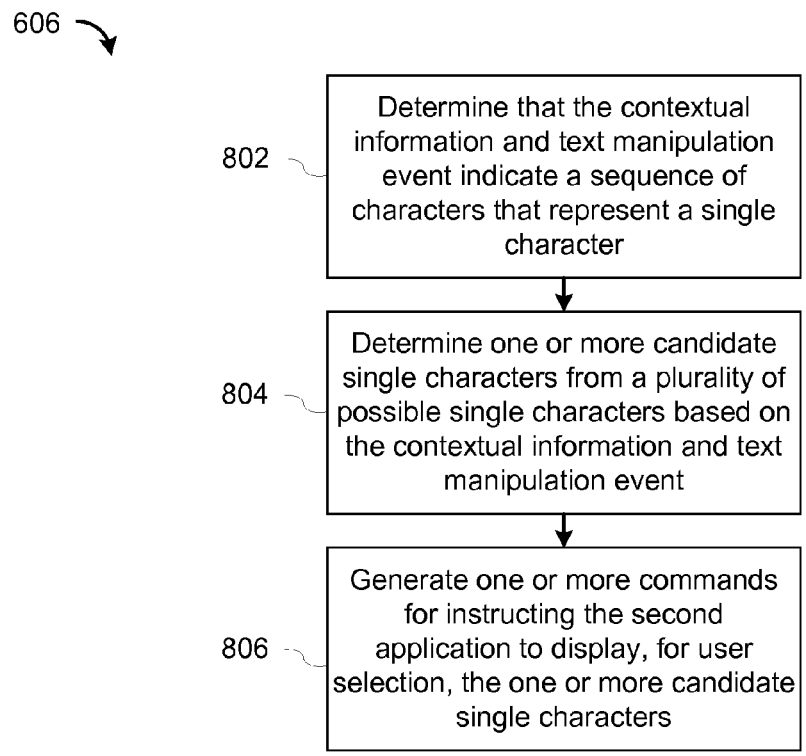
FIG. 8 is a flowchart of a method for determining commands to be sent to an application when the contextual information and text manipulation event indicate that a sequence of characters represent a single character, according to some embodiments.
Figure 9:
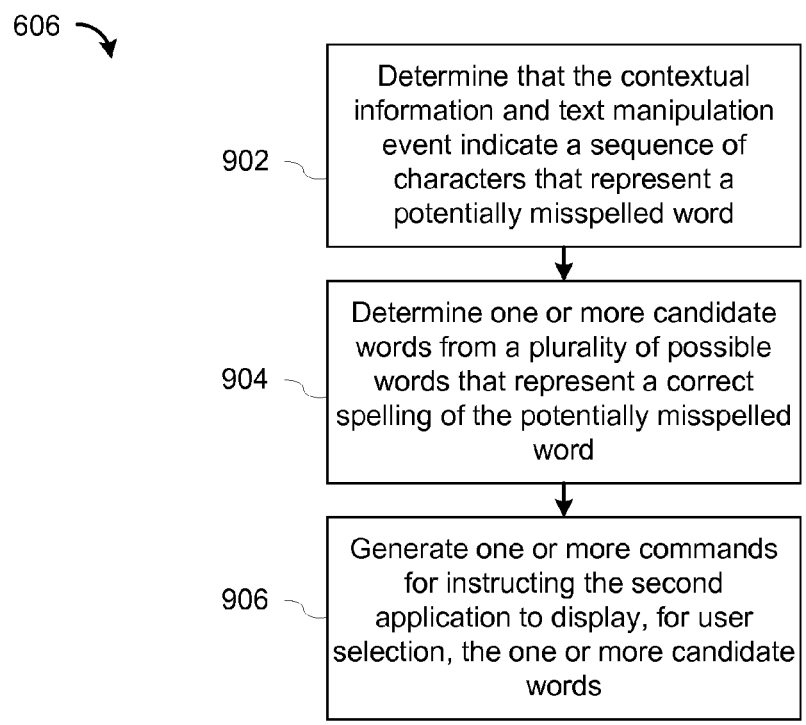
FIG. 9 is a flowchart of a method for determining commands to be sent to an application when the contextual information and text manipulation event indicate that a sequence of characters represent a potentially misspelled word, according to some embodiments.
Figure 10:
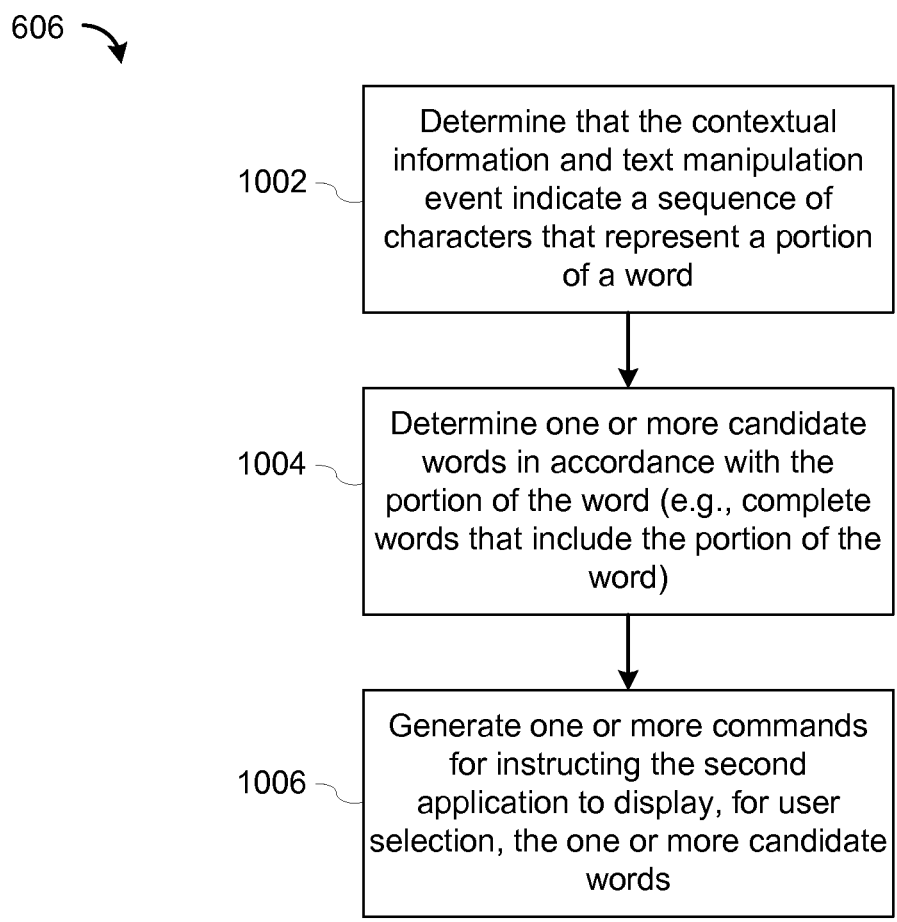
FIG. 10 is a flowchart of a method for determining commands to be sent to an application when the contextual information and text manipulation event indicate that a sequence of characters represent a portion of a word, according to some embodiments.

Attention is now directed to FIG. 7, which is a flowchart of a method 700 for determining, by the second application, contextual information that provides context to a text manipulation event, according to some embodiments. In response to the querying by the control application, the second application determines (702) contextual information providing context to the text manipulation event. In some embodiments, the second application determines (702) the contextual information providing context to the text manipulation event by determining (704) a text direction associated with a logical location of the text manipulation event and determining (706) boundaries of a predetermined text unit that includes the text associated with the logical location of the text manipulation event based on the text direction. The contextual information depends on a direction of the text and the boundaries of the predetermined text unit. For example, English is written from the left to the right of a page and then from the top of the page to the bottom of the page. In contrast, Chinese is written from the top of the page to the bottom the page and then from right of the page to the left of the page. In the case of English, when the text manipulation event is the insertion of a sequence of characters, the contextual information may include characters to the left and above the last character inserted (i.e., the preceding characters entered). In the case of Chinese, when the text manipulation event is the insertion of a sequence of characters, the contextual information may include characters above and to the right of the last character inserted (i.e., the preceding characters entered). The second application then responds (708) to the querying by the control application by providing the contextual information providing context to the text manipulation event that occurred in the user interface of the second application.

Returning to FIG. 6, the control application then determines (606) the one or more commands based on the contextual information providing context to the text manipulation event.

In some embodiments, the text manipulation and the contextual information indicate that a user is entering one or more characters that form a single character. For example, when entering characters in some Asian languages, multiple characters (or strokes) are required to build up a single character. These embodiments are described with respect to FIG. 8, which is a flowchart of a method for determining (606) commands sent to an application when the contextual information and text manipulation event indicate that a sequence of characters represent a single character, according to some embodiments. The control application determines (802) that the contextual information and text manipulation event indicate a sequence of characters that represent a single character. Next, the control application determines (804) one or more candidate single characters from a plurality of possible single characters based on the contextual information and text manipulation event. The candidate single characters may be selected so as to be not only consistent with the text manipulation event, but also to be consistent with the contextual information. Optionally, statistical information concerning historical usage of character sequences (by a community of users, or by the user of the device, or both) that include the contextual information may be used to select either a predefined number or context dependent number of candidate characters. Optionally, any of a variety of auto-completion methodologies may be used to identify the candidate single characters. The control application then generates (806) one or more commands for instructing the second application to display, for user selection, the one or more candidate single characters.

In some embodiments, the text manipulation event and the contextual information indicate that a word is potentially misspelled. For example, a user may enter a sequence of characters (e.g., the text manipulation event) that forms a word that is potentially misspelled. These embodiments are described with respect to FIG. 9, which is a flowchart of a method for determining (606) commands sent to an application when the contextual information and text manipulation event indicate that a sequence of characters represent a potentially misspelled word, according to some embodiments. The control application determines (902) that the contextual information and text manipulation event indicate a sequence of characters that represent a potentially misspelled word. Note that a potentially misspelled word may be a word that is not in a dictionary for a respective language or that may be included in a database of historically misspelled words. Next, the control application determines (904) one or more candidate words from a plurality of possible words that represent a correct spelling of the potentially misspelled word. The control application then generates (906) one or more commands for instructing the second application to display, for user selection, the one or more candidate words.

In some embodiments, the text manipulation event and the contextual information indicate a user is entering characters that represent a portion of a word. For example, the user may have typed the characters "a", "u", "t", "o", and "m" representing a portion of the word (e.g., "automatic", "automobile", etc.). The control application may attempt to predict one or more words (sometimes called candidate words) that the user intends to type. These embodiments are described with respect to FIG. 10, which is a flowchart of a method for determining (606) commands sent to an application when the contextual information and text manipulation event indicate that a sequence of characters represent a portion of a word, according to some embodiments. The control application determines (1002) that the contextual information and text manipulation event indicate a sequence of characters that represent a portion of a word. Next, the control application determines (1004) one or more candidate words in accordance with the portion of the word. For example, the candidate words are typically selected from a set of complete words that include the portion of the word. The control application then generates (1006) one or more commands for instructing the second application to display, for user selection, the one or more candidate words.

Returning to FIG. 6, after the one or more commands have been determined based on the contextual information that provides context to the text manipulation event (606), the control application issues (608) the one or more commands to the second application. In response to the issuing of the one or more commands by the control application, the second application typically executes the one or more commands issued by the control application. However, in some situations, the second application need not execute the command or commands issued by the control application, or may execute some but not all of the commands issued by the control application.

In some embodiments, the contextual information for the second application that has been obtained by the control application may no longer be relied upon by the control application. For example, the second application may have modified text independent of user input (e.g., regardless of whether a text manipulation event has occurred or not). Thus, in some embodiments, the second application notifies the control application that contextual information retained by the control application for the second application can no longer be relied upon by the control application. Similarly, the second application may modify a selection of text independent of user input. Thus, in some embodiments, the second application notifies the control application that a selection of text in the second application has changed. In addition, if the second application does not execute one or more commands issued by the control application, which would typically render the contextual information retained by the control information invalid, the second application notifies the control application that contextual information retained by the control application can no longer be relied upon by the control application.

In some embodiments, the methods and systems described above for responding to and processing text manipulation events in the user interface of an application are applied to content manipulation events, which manipulate content (e.g., text, images, objects, etc.) in the user interface of an application, while providing enhanced content services (including, for example, one or more of the aforementioned enhanced keyboard services) to the application. Content manipulation events are a superset of text manipulation events.

The methods illustrated in FIGS. 6-10 may be governed by instructions that are stored in a computer readable storage medium and that are executed by one or more processors of a respective multifunction device. Each of the operations shown in FIGS. 6-10 may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted and/or executable by the device's one or more processors.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A system, comprising:
one or more processors;
memory; and
a control application stored in the memory, the control application comprising instructions to:
retain contextual information for a second application;
receive a notification from the second application that the retained contextual information is outdated;
receive an indication that a text manipulation event has occurred based on a keyboard input that modifies text in a user interface of the second application, wherein the keyboard input is generated based on input with a keyboard that includes keys with corresponding hit zones;
send a query to the second application to obtain updated contextual information established by the second application prior to the event, wherein the updated contextual information is based on internal state information for the second application that is not directly accessible by the control application, and the updated contextual information provides context to the text manipulation event that occurred at the location in the user interface of the second application;
receive the updated contextual information from the second application; and
adjust a size of the hit zone of one or more keys on the keyboard based on the updated contextual information providing context to the text manipulation event; and
wherein the one or more commands cause the second application to execute the one or more commands issued by the control application.

2. The system of claim 1, wherein the contextual information relating to the text manipulation event includes a logical location and a predetermined unit of text relating to the text manipulation event.

3. The system of claim 2, wherein the predetermined unit of text is selected from the group consisting of: a character, a word, a sentence, a paragraph, a line of text, a section of a document, and a document.

4. The system of claim 2, wherein the logical location of the text manipulation event is selected from the group consisting of:
a point between two characters in the user interface of the second application; and
a range including one or more characters that is selected in the user interface of the second application.

5. The system of claim 4, wherein a respective query from the control application requesting the contextual information of the text manipulation event includes a physical location of the text manipulation event in the user interface of the second application, and the logical location of the text manipulation event corresponds to the physical location.

6. The system of claim 1, wherein the text manipulation event is selected from the group consisting of:
an insertion of one or more characters;
a deletion one or more characters;
a selection of one or more characters; and
a deselection of one or more characters.

7. The system of claim 1, wherein the control application includes instructions to determine the one or more commands, based on the contextual information providing context to the text manipulation event, prior to issuing the one or more commands to the second application.

8. The system of claim 7, wherein the instructions to determine the one or more commands include instructions to:

determine that the contextual information and text manipulation event indicate a sequence of characters that represent a single character;

determine one or more single characters from a plurality of possible single characters based on the contextual information and text manipulation event; and generate one or more commands for instructing the second application to display, for user selection, the one or more single characters from the plurality of possible single characters.

9. The system of claim 7, wherein the instructions to determine the one or more commands include instructions to:

determine that the contextual information and text manipulation event indicate a sequence of characters that represent a potentially misspelled word;

determine one or more words from a plurality of possible words that represent a correct spelling of the potentially misspelled word; and generate one or more commands for instructing the second application to display, for user selection, the one or more words from the plurality of possible words.

10. The system of claim 7, wherein the instructions to determine the one or more commands include instructions to:

determine that the contextual information and text manipulation event indicate a sequence of characters that represent a portion of a word;

determine one or more candidate words in accordance with the portion of the word; and generate one or more commands for instructing the second application to display, for user selection, the one or more candidate words.

11. The system of claim 1, wherein the second application includes instructions to determine the contextual information providing context to the text manipulation event.

12. The system of claim 11, wherein the instructions to determine the contextual information providing context to the text manipulation event include instructions to:

determine a text direction associated with a logical location of the text manipulation event; and determine boundaries of a predetermined text unit that includes the text associated with the logical location of the text manipulation event based on the text direction.

13. The system of claim 1, wherein the control application includes instructions to receive the text manipulation event in the user interface of the second application.

14. The system of claim 1, wherein the second application includes instructions to notify the control application that contextual information obtained by the control application from the second application can no longer be relied upon by the control application.

15. The system of claim 1, wherein the second application includes instructions to notify the control application that a selection of text in the second application has changed.

16. The system of claim 1, wherein the control application provides enhanced keyboard services to the second application based on the internal state information.

17. The system of claim 16, wherein the enhanced keyboard services comprise one or more services selected from the group consisting of: spelling correction, autocompletion, grammar correction, and adjusting a hit zone of one or more soft keyboard keys.

18. The system of claim 1, wherein the contextual information that is not directly accessible to the control application comprises text position information for text adjacent to the location.

19. The system of claim 1, wherein the internal state information is not directly accessible to the control application if one or more memory locations of the application internal state information are not known to the control application.

20. The system of claim 1, wherein the internal state information is not directly accessible to the control application if the second application stores the internal state information in a manner unknown to the control application.

21. The system of claim 1, wherein the control application further comprises instructions to, prior to querying the second application to obtain contextual information:

determine whether the control application has sufficient contextual information for providing an enhanced keyboard function to the second application; and wherein the querying is in accordance with a determination that the control application does not have sufficient contextual information for providing the enhanced keyboard function to the second application.

22. The system of claim 1, wherein the control application further comprises instructions to:

determine the type of text manipulation event that has occurred at the location; and wherein the one or more commands issued to the second application are based on the contextual information and the type of text manipulation event.

23. The system of claim 1, wherein the control application further comprises instructions to store a usage history for a user for providing the enhanced keyboard services.

24. The system of claim 1, wherein the control application provides an application programming interface (API) to enable enhanced keyboard services on the second application.

25. The system of claim 1, wherein the second application is a third party application executing on the device and the control application is a first party application executing on the device.

26. The system of claim 1, wherein the control application further comprises instructions to retain contextual information for a plurality of additional secondary applications.

27. A computer-implemented method, comprising:

at a computer system including one or more processors and memory storing one or more programs including a control application and a second application, the one or more processors executing the one or more programs to perform the operations of:

retaining contextual information for a second application;

receiving a notification from the second application that the retained contextual information is outdated;

receiving, by the control application, an indication that a text manipulation event has occurred based on a keyboard input that modifies text in a user interface of the second application, wherein the keyboard input is generated based on input with a keyboard that includes keys with corresponding hit zones;

sending, by the control application, a query to the second application to obtain updated contextual information established by the second application prior to the event, wherein the updated contextual information is based on internal state information for the second application that is not directly accessible by the control application, and the updated contextual information provides context to the text manipulation event that occurred at the location in the user interface of the second application;

receiving the updated contextual information from the second application; and adjusting a size of the hit zone of one or more keys on the keyboard based on the updated contextual information providing context to the text manipulation event.

28. The method of claim 27, wherein in response to the querying by the control application, the method further comprises:
receiving a response from the second application providing the contextual information providing context to the text manipulation event that occurred in the user interface of the second application.

29. The method of claim 27, wherein the contextual information providing context to the text manipulation event comprises information about a text direction associated with a logical location of the text manipulation event and one or more boundaries of a predetermined text unit that includes the text associated with the logical location of the text manipulation event based on the text direction.

30. The method of claim 27, wherein the contextual information relating to the text manipulation event includes a logical location and a predetermined unit of text relating to the text manipulation event.

31. The method of claim 30, wherein the predetermined unit of text is selected from the group consisting of: a character, a word, a sentence, a paragraph, a line of text, a section of a document, and a document.

32. The method of claim 30, wherein the logical location of the text manipulation event is selected from the group consisting of:
a point between two characters in the user interface of the second application; and
a range including one or more characters that is selected in the user interface of the second application.

33. The method of claim 32, wherein a respective query from the control application requesting the contextual information of the text manipulation event includes a physical location of the text manipulation event in the user interface of the second application, and the logical location of the text manipulation event corresponding to the physical location.

34. The method of claim 27, wherein the text manipulation event is selected from the group consisting of:
an insertion of one or more characters;
a deletion one or more characters;
a selection of one or more characters; and
a deselection of one or more characters.

35. The method of claim 27, including determining, by the control application, the one or more commands, based on the contextual information providing context to the text manipulation event, prior to issuing the one or more commands to the second application.

36. The method of claim 35, further comprising:
determining that the contextual information and text manipulation event indicate a sequence of characters that represent a single character;
determining one or more single characters from a plurality of possible single characters based on the contextual information and text manipulation event; and
generating one or more commands for instructing the second application to display, for user selection, the one or more single characters from the plurality of possible single characters.

37. The method of claim 35, further comprising:
determining that the contextual information and text manipulation event indicate a sequence of characters that represent a potentially misspelled word;
determining one or more words from a plurality of possible words that represent a correct spelling of the potentially misspelled word; and
generating one or more commands for instructing the second application to display, for user selection, the one or more words from the plurality of possible words.

38. The method of claim 35, further comprising:
determining that the contextual information and text manipulation event indicate a sequence of characters that represent a portion of a word;
determining one or more words from a plurality of candidate words, each comprising a complete words that incorporates the portion of the word; and
generating one or more commands for instructing the second application to display, for user selection, the one or more candidate words.

39. The method of claim 27, including receiving, by the control application, the text manipulation event in the user interface of the second application.

40. The method of claim 27, further comprising receiving, from the second application, notification at the control application that contextual information obtained by the control application from the second application can no longer be relied upon by the control application.

41. The method of claim 27, further comprising receiving, from the second application, notification at the control application that a selection of text in the second application has changed.

42. A non-transitory computer readable storage medium storing one or more programs configured for execution by a computer, the one or more programs comprising:
a control application stored in the memory, the control application comprising instructions to:
retain contextual information for a second application;
receive a notification from the second application that the retained contextual information is outdated;
receive an indication that a text manipulation event has occurred based on a keyboard input that modifies text in a user interface of the second application, wherein the keyboard input is generated based on input with a keyboard that includes keys with corresponding hit zones;
send a query to the second application to obtain updated contextual information established by the second application prior to the event, wherein the updated contextual information is based on internal state information for the second application that is not directly accessible by the control application, and the updated contextual information provides context to the text manipulation event that occurred at the location in the user interface of the second application;
receive the updated contextual information from the second application; and
adjust a size of the hit zone of one or more keys on the keyboard based on the updated contextual information providing context to the text manipulation event; and
wherein the one or more commands cause the second application to execute the one or more commands issued by the control application.

43. A computer-implemented method, comprising:
at a computer system including one or more processors and memory storing one or more programs including a control application and a second application, the one or more processors executing the one or more programs to perform the operations of:
retaining contextual information for a second application;
receiving a notification from the second application that the retained contextual information is outdated;
receiving, by the control application, an indication that a text manipulation event has occurred based on a keyboard input that modifies text in a user interface of the second application, wherein the keyboard input is generated based on input with a keyboard that includes keys with corresponding hit zones;

sending, by the control application, a query to the second application to obtain updated contextual information established by the second application prior to the event, wherein the updated contextual information is based on internal state information for the second application that is not directly accessible by the control application, and the updated contextual information provides context to the text manipulation event that occurred at the location in the user interface of the second application;

receiving the updated contextual information from the second application;

determining, by the control application, one or more commands based on the updated contextual information providing context to the text manipulation event; and adjusting a size of the hit zone of one or more keys on the keyboard based on the updated contextual information providing context to the text manipulation event.

44. The non-transitory computer-readable storage medium of claim 42, wherein the contextual information relating to the text manipulation event includes a logical location and a predetermined unit of text relating to the text manipulation event.

45. The non-transitory computer-readable storage medium of claim 44, wherein the predetermined unit of text is selected from the group consisting of: a character, a word, a sentence, a paragraph, a line of text, a section of a document, and a document.

46. The non-transitory computer-readable storage medium of claim 44, wherein the logical location of the text manipulation event is selected from the group consisting of:

a point between two characters in the user interface of the second application; and a range including one or more characters that is selected in the user interface of the second application.

47. The non-transitory computer-readable storage medium of claim 42, wherein the text manipulation event is selected from the group consisting of:

an insertion of one or more characters;

a deletion one or more characters;

a selection of one or more characters; and a deselection of one or more characters.

48. The non-transitory computer-readable storage medium of claim 42, wherein the control application includes instructions to determine the one or more commands, based on the contextual information providing context to the text manipulation event, prior to issuing the one or more commands to the second application.

49. The non-transitory computer-readable storage medium of claim 42, wherein the second application includes instructions to determine the contextual information providing context to the text manipulation event.

50. The non-transitory computer-readable storage medium of claim 42, wherein the control application includes instructions to receive the text manipulation event in the user interface of the second application.

51. The non-transitory computer-readable storage medium of claim 42, wherein the second application includes instructions to notify the control application that contextual information obtained by the control application from the second application can no longer be relied upon by the control application.

52. The non-transitory computer-readable storage medium of claim 42, wherein the second application includes instructions to notify the control application that a selection of text in the second application has changed.

* * * * *